(12) United States Patent  
Dronge

(10) Patent No.: US 7,864,983 B2
(45) Date of Patent: Jan. 4, 2011

(54) SECURITY ALARM SYSTEM

(76) Inventor: Mark Dronge, 33 Kenwood Rd., Tenafly, NJ (US) 07670

( * ) Notice: Subject to any disclaimer, the term of this patent is extended or adjusted under 35 U.S.C. 154(b) by 47 days.

(21) Appl. No.: 12/430,463

(22) Filed: Apr. 27, 2009

(65) Prior Publication Data

US 2009/0225166 A1    Sep. 10, 2009

Related U.S. Application Data

(63) Continuation of application No. 11/692,430, filed on Mar. 28, 2007, now Pat. No. 7,526,105.

(60) Provisional application No. 60/743,894, filed on Mar. 29, 2006, provisional application No. 60/804,660, filed on Jun. 14, 2006.

(51) Int. Cl.
*G06K 9/00*    (2006.01)

(52) U.S. Cl. ........................................ 382/107; 348/143

(58) Field of Classification Search ................. 382/100, 382/103, 106, 107, 159, 170, 181, 190, 195, 382/203, 206; 348/142, 143, 152, 155, 159, 348/169

See application file for complete search history.

(56) References Cited

U.S. PATENT DOCUMENTS

| 4,679,077 | A |   | 7/1987  | Yuasa et al. |
|-----------|---|---|---------|--------------|
| 5,091,780 | A | * | 2/1992  | Pomerleau ................. 348/152 |
| 5,283,551 | A |   | 2/1994  | Guscott |
| 5,473,311 | A |   | 12/1995 | Hoseit |
| 5,576,972 | A |   | 11/1996 | Harrison |
| 5,748,775 | A |   | 5/1998  | Tsuchikawa et al. |
| 5,864,640 | A |   | 1/1999  | Miramonti et al. |
| 5,963,148 | A |   | 10/1999 | Sekine et al. |
| 6,069,655 | A | * | 5/2000  | Seeley et al. ................. 348/154 |
| 6,396,535 | B1 |  | 5/2002  | Waters |
| 6,532,901 | B2 |  | 3/2003  | Isley et al. |
| 6,538,689 | B1 | * | 3/2003 | Chang ................. 348/159 |
| 6,546,115 | B1 | * | 4/2003 | Ito et al. ................. 382/100 |
| 6,782,847 | B1 |  | 8/2004  | Shemesh et al. |
| 6,864,789 | B2 |  | 3/2005  | Wolfe |

(Continued)

FOREIGN PATENT DOCUMENTS

DE    10122294    3/2003

(Continued)

OTHER PUBLICATIONS

"TAC I/NETSeven Security", TAC, Jan. 2006.

(Continued)

*Primary Examiner*—Anand Bhatnagar
(74) *Attorney, Agent, or Firm*—Brian Roffe

(57) ABSTRACT

Security alarm system for protecting a structure includes motion detectors connected to cameras. Each camera has a dormant state in which images are not obtained and an active state in which images are obtained and is activated into the active state when an associated motion detector detects motion. A processor is coupled to the camera(s) and arranged to control the camera(s) and receive the image obtained thereby. A telecommunications module is coupled to the processor. A handheld telecommunications unit transmits commands to the processor via the telecommunications module to cause the processor to provide images, obtained from the camera(s), to the telecommunications module to be transmitted to the telecommunications unit.

20 Claims, 4 Drawing Sheets

U.S. PATENT DOCUMENTS

| | | | |
|---|---|---|---|
| 6,985,172 B1* | 1/2006 | Rigney et al. | 348/149 |
| 7,128,024 B2 | 10/2006 | Doyle, II | |
| 7,149,422 B2 | 12/2006 | Schnell | |
| 2003/0202102 A1* | 10/2003 | Shiota et al. | 348/159 |
| 2004/0081338 A1 | 4/2004 | Takenaka | |
| 2004/0215750 A1 | 10/2004 | Stilp | |
| 2005/0151851 A1 | 7/2005 | Schnell | |
| 2005/0179553 A1 | 8/2005 | Fujie | |

FOREIGN PATENT DOCUMENTS

| | | |
|---|---|---|
| EP | 1030188 A1 | 8/2000 |
| EP | 1388802 A2 | 11/2004 |
| JP | 1140396 | 6/1989 |
| JP | 5064198 | 3/1993 |
| JP | 5328355 | 12/1993 |
| JP | 7050825 | 2/1995 |
| JP | 2004077350 | 3/2004 |
| WO | 9828706 | 7/1998 |

OTHER PUBLICATIONS

Supplementary European Search Report for EP 07 75 4166 dated Oct. 15, 2010.

* cited by examiner

SECURITY ALARM SYSTEM

CROSS REFERENCE TO RELATED APPLICATIONS

This application is a continuation of U.S. patent application Ser. No. 11/692,430 filed Mar. 28, 2007, now U.S. Pat. No. 7,526,105, and which claims priority under 35 U.S.C. §119(e) of U.S. provisional patent application Ser. No. 60/743,894 filed Mar. 29, 2006, and U.S. provisional patent application Ser. No. 60/804,660 filed Jun. 14, 2006, all of which are incorporated by reference herein.

FIELD OF THE INVENTION

The present invention relates generally to a system and method for enabling an individual interested in the integrity of a structure to communicate with an alarm system on the structure and obtain information about the structure and its environment, e.g., images from cameras mounted on or around the structure.

The present invention also relates generally to an alarm system which is designed to determine whether a threat to private property exists and more particularly, to an alarm system for a house or other structure where the presence of a threat is primarily posed by wild animals.

The present invention also relates to an alarm system for determining the presence of a threat posed by wild animals to an unoccupied house or other structure and which provides for remote activation of security features to reduce or eliminate the potential threat.

BACKGROUND OF THE INVENTION

In the prior art, there are numerous alarm systems which are installed in connection with houses and other structure for alerting residents or security personnel to a threat to the house or the individuals therein. For example, alarm systems are known which generate loud noises when a door is opened without authorization or a window is broken, and/or which notify security personnel of such conditions to enable such personnel to respond to the house.

Some patents and patent publications that describe such security systems include: U.S. Pat. Nos. 4,697,077 (Yuasa et al.), 5,283,551 (Guscott), 5,576,972 (Harrison), 5,825,412 (Hobson et al.), 5,937,092 (Wootton et al.), 6,069,655 (Seeley et al.), 6,400,265 (Saylor et al.), German Patent Publication No. DE 10122294, International Patent Publication No. WO 98/28706 (WO '706) and Japanese Patent No. JP2004077350 (JP '350).

Guscott describes an intrusion alarm system including a triggering sensor and a linear array of sensors triggered to sample an area of interest when activated by the triggering sensor. Differences in the sample infrared emissions enable a determination of the object as a human or a dog.

Harrison describes a monitoring system including various sensors, one of which is an optical sensor, and data from all of the sensors is directed to a neural network computer which analyzes the data and detects and identifies the objects in the sensed area which may be people, animals or objects.

Hobson et al. describes a video detection system for monitoring railroad crossings wherein a camera views the railroad crossing and establishes the presence of objects and the size thereof. An alarm is sounded based on the size of the object.

Wootton et al. describes a security system in which images of a detection area are sensed and compared with previously obtained images to determine the presence and movement of an intruder in the detection area. In this regard, reference is made to Yuasa et al. which is said to describe use of a frame subtraction technique to derive the presence of an object and conveyance of this information to a remote location for viewing by a human.

Seeley et al. describes a security system in which video cameras send images from a site control unit (SCU) to a central station which may be remote from the SCU. Video signals from the cameras are directed to an image processor section which determines the presence of an intruder and classifies the intruder.

Saylor et al. describes a security system wherein images obtained from a security camera are transmitted over the Internet to be seen on a computer. Other ways to be informed of the existence of an alarm condition are also mentioned.

German Patent Publication No. DE 10122294 describes an alarm system which undertakes different actions based on detection of an animal in a detection area.

WO '706 describes a video detection system in which different objects are recognized by comparing a set of shape features (e.g., an outline), derived from comparison of an instantaneously obtained image to previously obtained images, to sets of features of humans and animals.

JP '350 describes a technique for determining whether an object is a human by comparing the silhouette of the object to previously registered silhouette information.

SUMMARY OF THE INVENTION

An embodiment of an alarm system for protecting a structure in accordance with the invention includes at least one motion detector arranged to have a field of view external of the structure and including an area proximate the structure and at least one camera associated with and coupled to each motion detector and wherein each camera is arranged relative to the associated motion detector(s) such that the camera has a field of view encompassing at least part of the field of view of the associated motion detector(s). Each camera has a dormant state in which images are not obtained and an active state in which images are obtained and is activated into the active state when the associated motion detector detects motion. A processor is coupled to the camera(s) and arranged to control the camera(s) and receive the image obtained thereby. A telecommunications module is coupled to the processor and capable of communications over a telecommunications network. A handheld telecommunications unit is provided for transmitting commands to the processor via the telecommunications module to cause the processor to provide images to the telecommunications module to be transmitted to the telecommunications unit. The commands can also cause the processor to direct the camera(s) to provide images thereto.

A method for protecting a structure in accordance with the invention includes arranging a plurality of motion detectors on or around the structure, each in a position in which its field of view includes an area proximate the structure, arranging a plurality of cameras on or around the structure, each camera being associated with one or more of the motion detectors such that the camera has a field of view encompassing at least part of the field of view of any associated motion detector, providing a processor which controls the at least one camera and receives the image obtained by the at least one camera, coupling a telecommunications module coupled to the processor, the telecommunications module being capable of communications over a telecommunications network, and transmitting commands from a handheld telecommunications unit to the processor via the telecommunications module to cause the processor to provide images to the telecommunications module to be transmitted to the telecommunications unit. The commands may also cause the processor to direct the camera(s) to obtain images.

The foregoing provides a new and improved system and method for enabling an individual interested in the integrity of a structure to communicate with an alarm system on the structure and obtain information about the structure and its environment, e.g., images from cameras mounted on or around the structure.

Another embodiment of a security system in accordance with the invention is designed to distinguish or discriminate between animals and humans with a view toward accurately determining a threat to private property which requires a response. The security system includes one or more motion detectors connected to one or more cameras which are connected to a computer which is connected in turn to a data communication or transmission device that can inform a homeowner off premises, the police, fire department and/or private security firm of the existence of an intrusion condition based on the images obtained by the camera.

In use, a motion detector detects motion in the field of view of an associated camera which then obtains one or more images, which presumably include the cause of the motion. A processor connected with the camera derives a silhouette of the object that triggered the motion from the obtained image (s), through image comparison with images taken without the object therein. A processor analyzes the silhouettes by comparing them to previously obtained silhouettes, such as those of various animals and humans having different sizes. A classification of the silhouette is obtained and depending on what object the silhouette is determined to correspond to, i.e., its identification, further action or countermeasures is taken. This further action may be: the object is classified as "no threat" and the system stays in stand-by or the object is classified as "hostile" or a threat and a message or warning is sent to a distant computer, the property's owner's homepage, the police and/or a private security firm.

More specifically, one embodiment of an alarm system for protecting a structure in accordance with the invention includes at least one motion detector arranged to have a field of view external of the structure and including an area proximate the structure, and at least one camera associated with each motion detector, each camera being arranged relative to the associated motion detector such that it has a field of view encompassing at least part of the field of view of the associated motion detector. Each camera has a dormant state in which images are not obtained and an active state in which images are obtained and being activated into the active state when the associated motion detector detects motion such that that camera obtains an image of the source of the motion detected by the associated motion detector. A processor is coupled to each camera and arranged to receive the image obtained thereby, derive a silhouette of any objects in the image, compare the silhouettes to a library of stored silhouettes having associated object identification to determine an exact or closest match of the derived silhouette to one of the stored silhouettes and retrieve the object identification associated with the exact or closest match. The processor reacts to the detection of motion by the motion detector based on the object identification.

Various associations of the cameras and motion detectors are possible. There may be a one-to-one correspondence or association between motion detectors and cameras, i.e., each motion detector has a single and exclusive camera whose field of view encompasses the field of view of the motion detector. There may be an overlapping camera arrangement wherein each motion detector is associated with two or more cameras (preferably located at different positions) whose field of view partly or entirely encompasses the field of view of the motion detector. In this manner, two images including the source of motion are obtained and independently analyzed in the manner described above. Different rules of object identification can be formulated for situations where the object identification is different. For each motion detector, there may be an exclusive set of two or more cameras, or alternatively, each camera can be associated with more than one motion detector so that it obtains an image when any of its associated motion detectors detects motion.

When two or more cameras obtain images of or containing the same object, which may arise in a situation where these cameras have an overlapping field of view relative to a single motion detector and are all activated by motion detected by that motion detector, images from cameras containing the object may be analyzed by the processor to obtain depth information about the object. This is similar to a stereo-vision concept and various techniques to derive depth information about an object contained in two or more images from different imaging devices or cameras are known to those skilled in the art. The depth information can be used to aid the processor in the object identification task, i.e., the object classification. This aspect of using multiple cameras to obtain images containing a common object, derive depth information about the object and use the depth information to obtain an identification of the object may be applied independent of the presence and particular arrangement of motion detectors and cameras described above. However, the presence of motion detectors to activate the cameras would be beneficial. Thus, one embodiment of the invention contemplates multiple cameras associated with each of at least one motion detector and arranged to be activated to obtain images of an object whose motion is detected by those cameras. These images can be analyzed to obtain depth information about the object, i.e., the distance from a known object to this moving object, and also to obtain identification information about this object for the purpose of determining whether this identified object at the determined distance is a threat.

As to the processor's reaction to the object identification, it can be programmed to assign a classification of "no threat" or "hostile" based on the object identification. The library of stored silhouettes preferably includes silhouettes of large and small animals and large and small humans in which case, the processor can be programmed to assign the hostile classification to large animals and humans and the no threat classification to small animals and humans. Other possible differentiations of classifications may be based on size. When a hostile classification is generated, the processor also preferably activates countermeasures based on the object identification. For example, the processor can command the alarm system to generate the audible and/or visual alarm in proximity to the structure and/or command a communication system to generate a communication about the condition of the structure and forward the communication to the remote destination, e.g., a police station, a fire station, a terminal monitored by an owner of the structure, or a private security station. The communication can include one or more images obtained by the camera(s) or one or more images derived from the images obtained by the camera(s).

An exemplifying method for protecting a structure in accordance with the invention includes arranging a plurality of motion detectors on or around the structure, each in a position in which its field of view includes an area proximate the structure, and arranging a plurality of cameras on or around the structure, each camera being associated with one or more of the motion detector such that the camera has a field of view encompassing at least part of the field of view of any associated motion detector. The cameras have a dormant state in which images are not obtained and an active state in which images are obtained and are activated into the active state when an associated motion detector detects motion such that the camera then obtains an image of the source of the motion detected by the associated motion detector. A processor is provided which receives images obtained by the cameras, derives a silhouette of any objects in the image, compares the silhouettes to a library of stored silhouettes having associated object identification to determine an exact or closest match of the derived silhouette to one of the stored silhouettes and retrieves the object identification associated with the exact or closest match. One or more countermeasures to the detection of motion by the motion detectors are generated based on the object identification when the object is identified as a potential threat to the structure.

A classification of "no threat" or "hostile" can be assigned by the processor based on the object identification, in which case, the countermeasure can be generated only when the classification is hostile. Countermeasures can include generating an audible and/or visual alarm in proximity to the structure and/or generating at least one communication about the condition of the structure based on the object identification and forwarding the communication to the remote destination, e.g., a police station, a fire station, a terminal monitored by an owner of the structure, or a private security station. The communication can include one or more images obtained from the cameras and/or one or more images derived from the images obtained from the cameras in the communication being forwarded to the remote destination.

Another method for monitoring a premises in accordance with the invention includes arranging an alarm system in connection with the premises, integrating a telecommunications module in connection with a computer of the alarm system, the telecommunications module being capable of communications over a telecommunications network, and programming the telecommunications module to receive commands from a handheld telecommunications unit over the telecommunications network to enable activation and deactivation of the alarm system using the telecommunications unit. The alarm system may include video cameras which obtain images of the premises, in which case, the images of the premises obtained by the video cameras can be transmitted upon receiving a command from the handheld telecommunications unit.

When the telecommunications unit is a cellular telephone, it can transmit a code number to the telecommunications module to control activation, deactivation and adjustment of the alarm system. When the telecommunications unit is a messaging device, it can transmit a message to the telecommunications module to control activation, deactivation and adjustment of the alarm system. When the telecommunications unit is a camera telephone and the alarm system includes video cameras which obtain images of the premises, the images of the premises obtained by the video cameras can be transmitted to the camera telephone upon satisfaction of threat conditions as determined by the alarm system.

A system for monitoring a premises in accordance with the invention includes an alarm system arranged in connection with the premises and including various sensors, cameras and the like for detecting a threat to the premises and a telecommunications module in connection with the sensors or a control component thereof. The telecommunications module is capable of communications over a telecommunications network. A handheld telecommunications unit is provided for transmitting commands to the telecommunications module to activate, deactivate and adjust the alarm system. The telecommunications unit may be an existing unit owned by the homeowner or alarm system monitor, such as a cellular telephone, iPod, PDA, laptop computer or desktop computer and the like.

When the alarm system includes video cameras which obtain images of the premises, it can transmit still-frame or motion picture images of the premises obtained by the video cameras upon receiving a command from the telecommunications unit. When the telecommunications unit is a cellular telephone, it can transmit a code number to the telecommunications module to control activation, deactivation and adjustment of the alarm system. When the telecommunications unit is a messaging device, it can transmit a message to the telecommunications module to control activation, deactivation and adjustment of the alarm system. When the telecommunications unit is a camera telephone and the alarm system includes video cameras which obtain images of the premises, the alarm system can transmit still-frame or motion picture images of the premises obtained by the video cameras to the camera telephone upon satisfaction of threat conditions as determined by the alarm system.

Other and further objects, advantages and features of the present invention will be understood by reference to the following specification in conjunction with the annexed drawings, wherein like parts have been given like numbers.

BRIEF DESCRIPTION OF THE DRAWINGS

The invention, together with further objects and advantages thereof, may best be understood by reference to the following description taken in conjunction with the accompanying drawings wherein like reference numerals identify like elements.

DETAILED DESCRIPTION OF THE INVENTION

Figure 1:
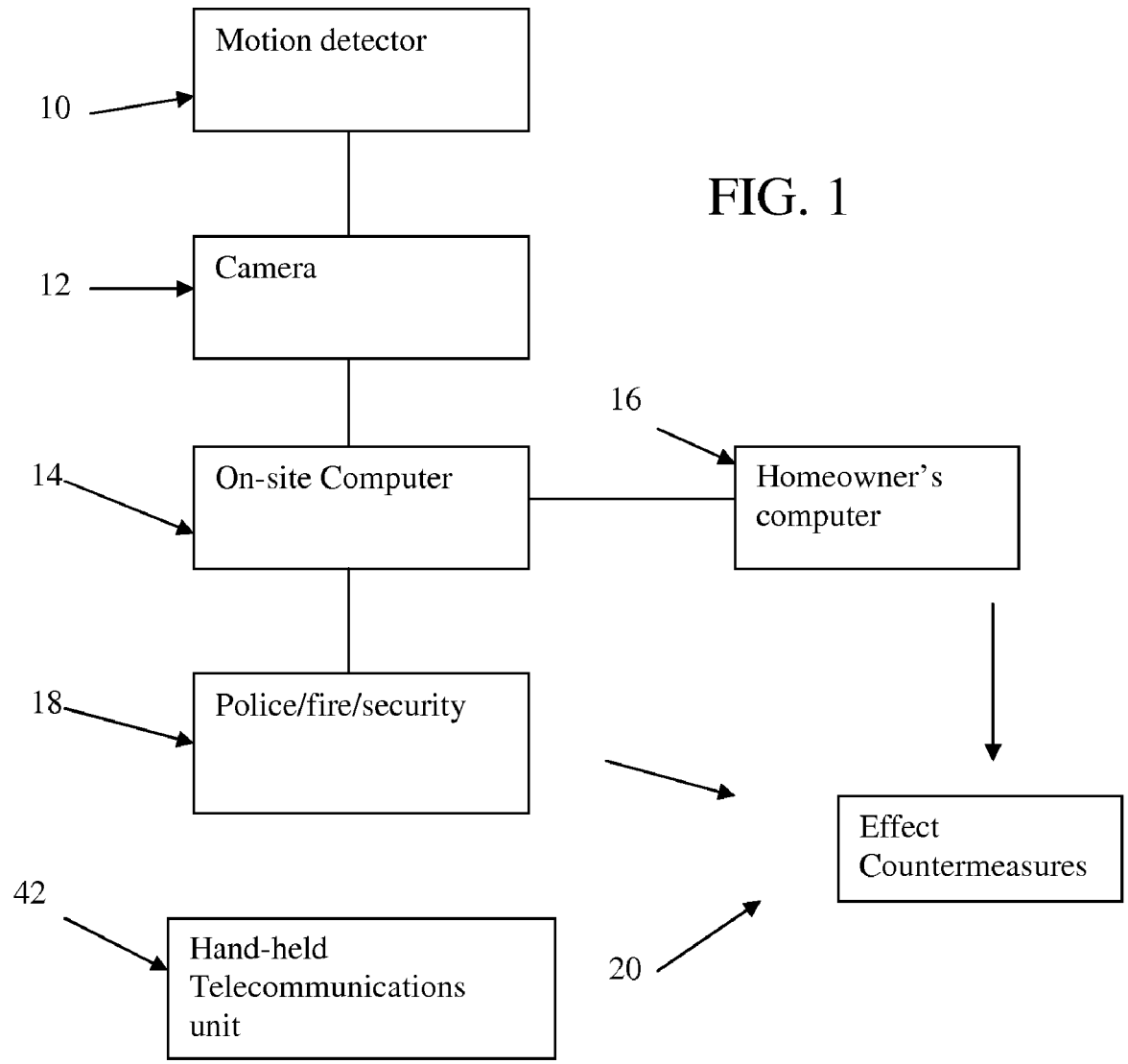
FIG. 1 is a schematic of a first embodiment of an alarm system in accordance with the invention.

Referring to the accompanying drawings, FIG. 1 shows a schematic of one exemplifying embodiment of an alarm system in accordance with the invention which includes, at the site at which the alarm system is installed, one or more motion detectors 10, one or more cameras 12 and an on-site computer 14.

Each motion detector 10 is mounted to the house, apartment or other premises or structure being monitored, hereinafter referred to as a house for simplicity sake, or on a structure around the house which could be dedicated to the mounting of the motion detector 10. For example, a motion detector could be mounted to the exterior wall of the house, to a post around the house, to a tree around the house, or to the roof of the house. The premises or structure being monitored may be any type of premises or structure which is typically monitored for security purposes, including but not limited to, a warehouse, a boatyard, a business, a boat, or a land vehicle such as one with a locating system.

Each motion detector 10 is mounted such that its field of view, i.e., the field in which it detects motion, is around the house in which an intruder could approach the house. For example, a motion detector 10 could be arranged to have a field of view in a path leading to the house, a field of view encompassing a length of a fence around the house or a field or a field of view adjacent the house, e.g., adjacent one or more windows of the house.

Figure 3:
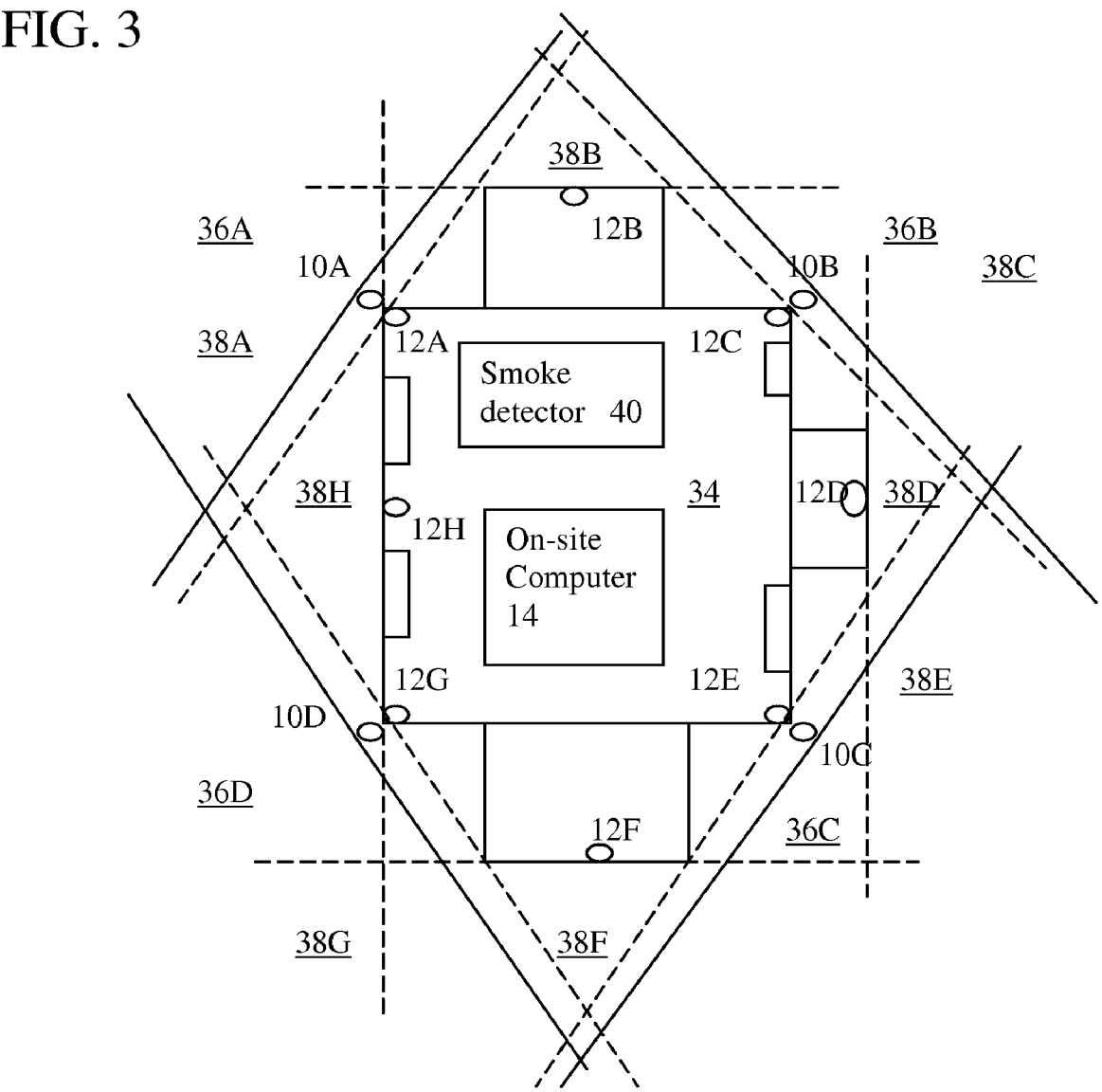
FIG. 3 is an overview of a house equipped with the alarm system in accordance with the invention.

With reference to FIG. 3 wherein the outline of a generic house 34 is shown, there are four motion detectors 10A, 10B, 10C, 10D mounted to the house 34 at its corners so as to provide overlapping fields of view. Each field of view 36A, 36B, 36C and 36D extends over an approximate 180 degree range a sufficient distance from the house, the exact distance depending on the type and construction of the motion detector installed in the alarm system. Of course, the number, placement and coverage area of the motion detectors will usually vary depending on such factors as the plan outline of the house, the location of doors and windows and the surrounding area.

Motion detectors 10 can be standard, off-the-shelf components which provide a signal indicative of the presence of motion above a threshold. In this case, small objects which might be blown aloft by wind, such as leaves, would not trigger the motion detector to provide an output signal. Further, the particular motion detectors selected could be those which only detect animate objects, e.g., humans or animals. In this case, if a fence post in a field of view of a motion detector 10 is being tilted by the wind, it would also not cause the motion detector to provide an output signal.

Each camera 12 is mounted to the house or on a structure around the house which could be dedicated to the mounting of the camera 12. For example, a camera could be mounted to the exterior wall of the house, to a post around the house, to a tree around the house, or to the roof of the house.

The mounting location of each camera 12 is selected in dependence on its field of view and the field of view of the motion detector 10 or motion detectors 12 with which it is associated. That is, in a preferred embodiment, each camera 12 is triggered to obtain an image only when its associated motion detector 10 detects motion in the field of view of the motion detector 10. Since it is this motion (or the cause thereof) for which an image is sought, one or more of the cameras 12 must be positioned to be able to obtain an image of the portion of the field of view of the motion detector 10 in which motion is detected thereby. In some situations, a single camera 12 can be associated with each motion detector 10 and have substantially overlapping fields of view so that when the motion detector 10 detects motion in its field of the view, the camera 12 is triggered to obtain an image which will necessarily encompass the source or cause of that motion. In other situations, two or more cameras 12 can be associated with each motion detector 10 and be spaced apart from one another. Each camera 12 would have a substantially overlapping field of view with the motion detector 10 so that when the motion detector 10 detects motion in its field of the view, both cameras 12 are triggered to obtain images which will necessarily encompass the source or cause of that motion. The use of multiple cameras for each motion detector 10 will aid in the subsequent image processing routine, discussed more fully below.

It is also possible that a single camera 12 has a field of view which encompasses the field of view of multiple motion detectors 10. In this case, when any of a plurality of motion detectors 10 detects motion, that camera 12 will be triggered to obtain an image.

With reference to FIG. 3, eight cameras 12A, 12B, 12C, 12D, 12E, 12F, 12G, 12H are shown mounted to the house 34 along its outer wall so as to provide overlapping fields of view. Each field of view 38A, 38B, 38C, 38D, 38E, 38F, 38G, 38H extends over an approximate 180 degree range a sufficient distance from the house, the exact distance depending on the type and construction of the cameras installed in the alarm system. As shown in FIG. 3, each field of view 36A, 36B, 36C and 36D of the motion detectors 10A, 10B, 10C and 10D overlaps with a plurality of fields of view 38A, 38B, 38C, 38D, 38E, 38F, 38G, 38H of cameras 12A, 12B, 12C, 12D, 12E, 12F, 12G, 12H. Thus, when motion is detector by one of the motion detectors 10, several cameras 12 will be triggered to obtain images. For example, when motion is detected by motion detector 10A, cameras 12A, 12B, 12C and 12D will obtain images.

Cameras can also be provided to visualize the house, or parts thereof, e.g., a camera can be mounted on a post distant from the door and directed toward the door to obtain an image of the house including the door. The same would also be applicable for images of the windows.

Of course, the number, placement and coverage area of the cameras will usually vary depending on such factors as the location of the motion detectors, the plan outline of the house, the location of doors and windows and the surrounding area.

Cameras 12 can be standard, off-the-shelf components which obtain images in individual frames and as in some conventional cameras, can be equipped with a light which is triggered when the ambient light is less than a threshold. Cameras can also be used which are infrared cameras which obtain infrared images. This is possible since, as discussed below, only the outline of the object causing the motion is needed for image processing.

The on-site computer 14 is connected to all of the cameras 12. On-site computer 14 can also be connected to the motion detectors 10 and control the cameras 12, i.e., the image-taking step, based on signals provided by the motion detectors. Alternatively, the cameras 12 are directly connected to the associated motion detector(s) 10 and take an image without involvement of the on-site computer 14.

An advantage of coupling the cameras 12 to the motion detectors 10 is that the cameras do not continually operate and obtain images of the environment around or including the house. Rather, the cameras 12 are only activated to obtain images when motion is detected by the associated one(s) of the motion detectors 10. This conserves electricity or battery power and is thus especially useful when the cameras are operating on battery power.

Computer 14 includes hardware and software components which perform, among other functions, image processing. That is, the computer 14 receives data from the cameras 12, in any form in which images can be conveyed electronically, and analyzes the images in a unique manner to analyze the threat level of the source of the motion. It is possible that only a single camera 12 will be taking an image of the area surrounding the house and providing this image in electronic form to the in-site computer 14. Alternatively, the on-site computer 14 will receive images from multiple cameras 12, all triggered by one motion detector, or from multiple cameras triggered by motion detected by multiple motion detectors, e.g., when the source of motion moves through the fields of view of multiple motion detectors.

Figure 2:
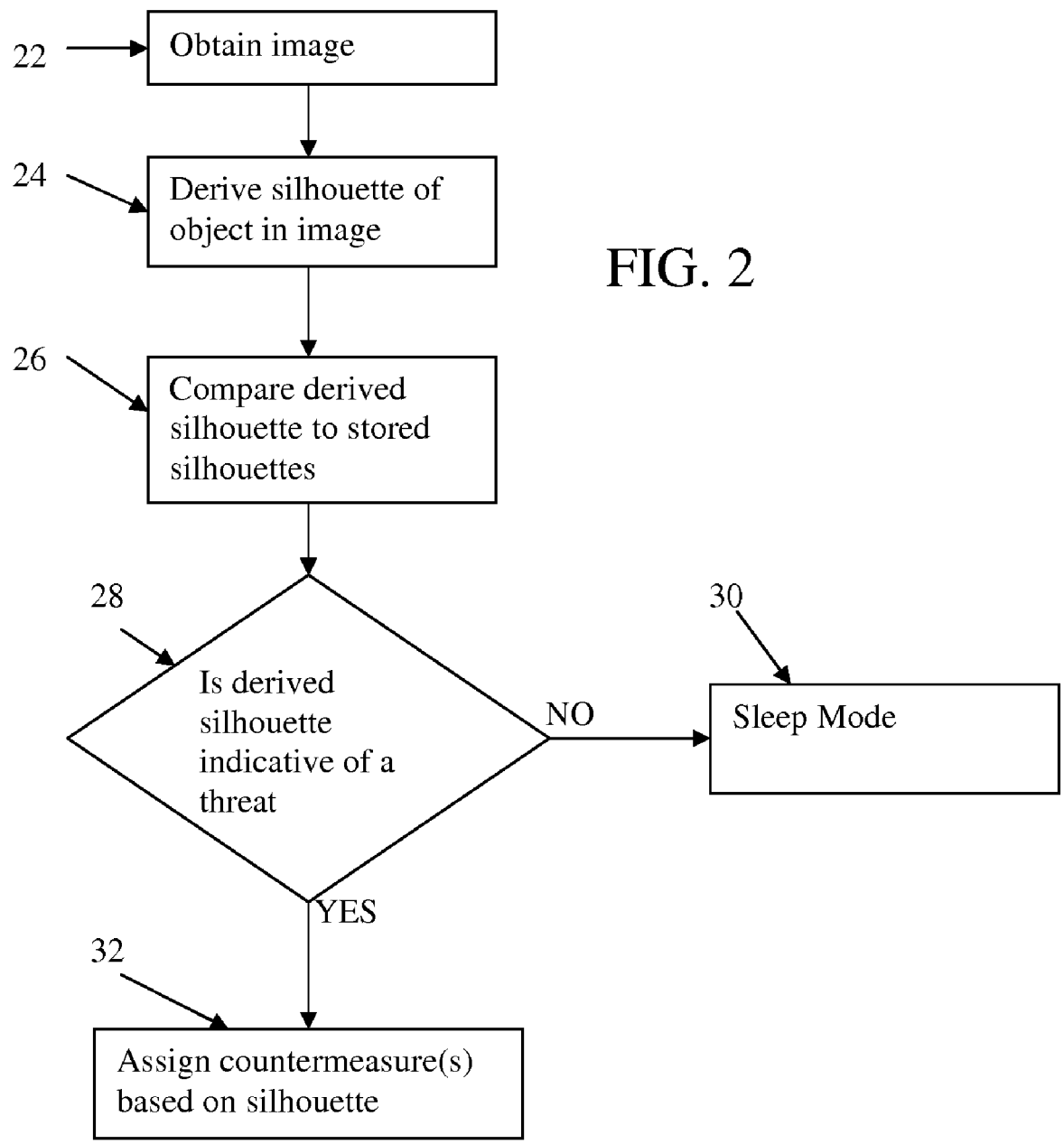
FIG. 2 is a flow chart of the manner in which an object is classified in the alarm system in accordance with the invention.

A preferred image processing technique is shown schematically in FIG. 2. The first step 22 for on-site computer 14 is to obtain an image. The image processing step is explained for the individual processing of a single image. If multiple images are received from the cameras 12, the image processing technique shown in FIG. 2 would be implemented for each image or depending on the processing software, could be implemented substantially simultaneously.

The second step 24 is to outline or derive a silhouette of an object in the image, this object being the one which caused the motion detector 10 to trigger the taking of the image by the camera 12. Each image will usually contain multiple objects, the silhouette of only one of which will be analyzed at each time. Thus, if several objects are detected in each image, for each object, an analysis will be made as whether that objects poses a threat to the house or its occupants. To reduce the number of objects being analyzed, a background image can be taken when the camera 12 is first installed on the house 34. Then, when another image is taken with the same camera, the background image can be subtracted from the current image to obtain differences between the current image and the background image and only object in this differential image are analyzed, e.g., by deriving a silhouette thereof. The background images would be stored in the on-site computer with an identification of the camera providing the background image and whenever an image is taken from a camera and received by the on-site computer 14, its stored background image is subtracted from the received image. Alternatively, the background image for each camera 12 can be stored on a processor associated with the camera and the subtraction performed at the camera so that only the differential image is provided to the on-site computer 14.

The third step 26 is to compare the derived silhouette of each object in the image to a library of stored silhouettes to determine the exact or closest correspondence between the derived silhouette and one or the stored silhouettes. The library is embodied in memory of the on-site computer 14 and includes silhouettes of objects expected to be found in the vicinity of the house. In particular, silhouettes of various animals and various sized humans are obtained, e.g., derived from images of known objects, and each silhouette is associated with the identity of the object providing the silhouette.

Silhouette derivation can be based on a number of descriptors that are typical for the human body, or on other factors which can be used to distinguish, discriminate and/or differentiate different objects and in particular, animals from humans. Silhouette derivation can also be designed to distinguish between large animals, such as bears, and small animals, such as cats and dogs, and between large humans and small humans. For humans, the on-site computer 14 can be designed to consider a silhouette of a human smaller than that of an average 8-year old not to be a threat while a silhouette of a human larger than that of an average 8-year old is considered a threat.

If the silhouette is determined to a human, an optional additional analysis might be made based on the duration of time that the individual is present on the premises. A threshold time period could be established and if the individual remains on the premises for longer than this threshold, they may be considered a threat whereas remaining on the premises for less time, would not be considered a threat.

After the silhouette of an object in the image is derived in step 24 and compared to stored silhouettes in step 26, the next step 28 is to determine whether the derived silhouette is indicative of a threat to the house being protected by the alarm system or occupants therein. Prior to installation of the system, the different objects are determined to constitute or pose a threat or not and silhouettes of those objects are stored in the library. In use, once the derived silhouette is determined to be an exact or probable match to one of the stored silhouettes, the identification of the objects associated with the stored silhouette is retrieved and considered the identity of the object causing the motion detected by the motion detector 10.

The on-site computer 14 may be programmed to perform the silhouette comparison and object identification based on the location of the house being protected and likely objects in that location. Thus, a deer and small human might be considered not to be a threat whereas a bear and large human might be considered a threat. The actual determination of whether each object constitutes a threat or not can depend on the environment of the house being protected so that one object in one environment might be considered a threat whereas the same object in a different object is not considered a threat.

The determination can entail assigning a class or classification to the object corresponding to the stored silhouette with which the derived silhouette is determined to be an exact or probable match, e.g., a classification of "no threat" or a classification of "hostile".

If the object corresponding to the stored silhouette with which the derived silhouette is determined to be an exact or probable match is not considered a threat, the alarm system enters into a sleep mode 30. In this mode, the alarm system waits for another incident of motion to be detected by one of the motion detectors 10 which causes an image to be taken by one or more cameras 12 and the image processing via on-site computer 14 begins again.

If the object corresponding to the stored silhouette with which the derived silhouette is determined to be an exact or probable match is considered hostile or a threat, in step 32, countermeasures are assigned based on the identification of the object. Countermeasures include generating an audible and/or visual alarm at the house, generating a communication to police personnel, fire personnel and/or a private security firm, and generating a communication to the homeowner. The communication generated by on-site computer 14 can be sent in a wired and/or wireless manner using any communication protocol. The communication can be sent to the homeowner's computer at a remote or distant location from the house being protected, and appear on the homeowner's homepage, or sent to an SMS or MMS or as an e-mail to the homeowner's e-mail address.

The communication can include an identification of the house or other object or premises being monitored, a message or warning specific to the identified object as determined by the on-site computer 14 and also preferably the image obtained by the camera 12 which caused the on-site computer 14 to generate the communication. The image in the communication can be the actual image, e.g., in a JPEG or other known image format, or a silhouette of the image. A derivation of the image can also be provided as part of the communication.

The communication can also include an image taken from all of the cameras monitoring the house. In particular, images can be generated and sent from cameras directed toward the house so that images of the house and its condition are provided as part of the communication.

When the image which caused the on-site computer 14 to generate the communication is provided as part of the communication, in particular when the communication is sent to police or fire personnel, the police and fire personnel can prepare a better response. Thus, if the image reveals the presence of multiple people, more police or file personnel can be directed to respond.

Furthermore, when the images of cameras showing the house or parts thereof is provided as part of the communication, in particular when the communication is sent to police or fire personnel, the police and fire personnel can prepare a better response. Thus, if the image reveals that no door is ajar and the windows are not broken, fewer police would be directed to respond as it is likely that the alarm is a false alarm or the intruders were scared away by the audible and/or visual countermeasures.

In a preferred embodiment, the alarm/security system is designed to be controlled by and/or provide data to a handheld telecommunications unit 42 (see FIG. 1) which can be a camera telephone, a cellular telephone, an Internet-enabled picture and/or video display device (e.g., an iPod-type device), and similar products. To this end, in the on-site computer 14, and possibly in a dedicated alarm hardware unit therein, there is a telecommunications module which the alarm system uses to communicate with the user or alarm monitor, i.e., whichever individual monitors the alarm system by possessing the telecommunications unit 42. The telecommunications module may be the telecommunications part of an advanced camera telephone or cellular telephone and include, for example, the necessary hardware and software to enable communications with a comparable telecommunications device.

An important advantage of integrating or incorporating a telecommunications unit from a camera telephone or cellular telephone into the on-site computer of the alarm system is that it becomes possible to activate the alarm using the telecommunications unit 42, from any location connected to a telecommunications network compatible with the telecommunications unit 42. Activating the alarm system can therefore be accomplished with only so much as a simple telephone call, a SMS with an ordinary cell phone, and the alarm system will be able to communicate with whomever it is programmed to communicate with, i.e., the house/apartment owner, police or fire department, or whomever it is programmed to communicate with. Deactivating the alarm system can be accomplished in the same manner.

Thus, control over the activation and deactivation of the alarm system, as well as other adjustment to the alarm system, can now be performed using a handheld telecommunications unit 42, whether it is cellular telephone or a camera telephone or other similar unit, such as a PDA. The handheld telecommunications unit 42 could be programmed to relay passwords to enable adjustment and control of the alarm system, or programmed to interface in any other manner with the alarm system using a telecommunications network.

An additional advantage of integrating the alarm system into a telecommunications network is that when the alarm system is triggered (or when the user provides commands to the telecommunications module using the telecommunications unit 42), it can send real-time pictures or video feed from the camera(s) 12 mounted inside/outside a house or apartment to a camera telephone monitored by the owner or other alarm system monitor. The alarm system can also send vital information collected by different kinds of sensors (fire, smoke, motion) or whatever data gathering devices are hooked up to the alarm system.

This telecommunications link allows someone distant from their house or apartment to check their house or apartment, e.g., by dialing a code number in the same way as a telephone number is dialed and/or sending an SMS to the alarm system, whether or not they have received an indication from the alarm system of triggering of the alarm system or potentially hostile or damaging motion around the house or apartment. The code number would be assigned to the alarm system, or programmed by the owner. Multiple code numbers could be assigned, each with a different function. Upon receipt of the code number or SMS, the alarm system would send pictures or videos from the camera(s) 12 back to telecommunications unit 42. This provides an incentive for people to purchase cameras capable of receiving images or services for enabling transmission of pictures in that they can receive pictures of monitored premises whenever an alarm condition is detected. The alarm security system could be packaged together with such a picture telephone. The person could also sent a code number that performs a specific control of the camera(s) 12, e.g., send images from one or more specific camera(s) 12 as directed by the owner via the telecommunications link.

There are thus at least two alternative or additive ways to monitor the premises using the handheld telecommunications unit 42. One way is for the user to enter a code, send a message or take some other action to cause the cameras 12 to obtain and transmit images of the vicinity of the premises (a user-activated monitoring), and the other way is when the alarm system triggers and sends images. In the latter case, the handheld telecommunications unit 42 can be programmed or designed to generate a notification to the user that the alarm has triggered and/or that images are being provided. Such a notification can be audible, vibratory, visual and combinations thereof.

The telecommunications link also allows a user to deactivate the alarm when the approach the premises and activate the alarm as they leave the premises by using their cellular telephone.

One particular scenario that should interest security companies as well as police and fire departments is that they can survey the premises being protected, e.g., a house or apartment, using the video camera(s) 12 in order to assess a threat level, false alarms, the number of intruders, smoke or raging flames, etc., before entering premises as the camera(s) 12 give them a complete picture of what to expect. This can even be done before they respond to the premises, for example, on their way to the premises.

Another scenario is if a homeowner in bed at night hears a noise in their house. The homeowner no longer needs to leave the safety and confines of his or her bedroom to investigate the source of the noise and thereby risk confrontation with an intruder. Rather, the homeowner can view pictures taken by one or more cameras 12 on a telecommunications unit 42 in the bedroom, e.g., on their night-table.

In another embodiment, one or more smoke and/or fire detectors 40 are arranged inside the house 34 (see FIG. 3) and coupled to the on-site computer 14. In this embodiment, when any of the smoke and/or fire detectors 40 is triggered based on the presence of smoke in the house 34 or a fire in the house 34, the on-site computer sends a communication to the fire personnel containing information about the premises and the existence of smoke and/or fire. Optionally, cameras can be located inside the house 34 and coupled to the smoke and/or fire detectors 40 so that when the smoke and/or fire detectors 40 are triggered, the associated camera(s) is/are also activated to obtain images of the cause of the smoke or fire condition. Such images can be transmitted in the communication by the on-site computer 14 to the fire personnel.

Figure 4:
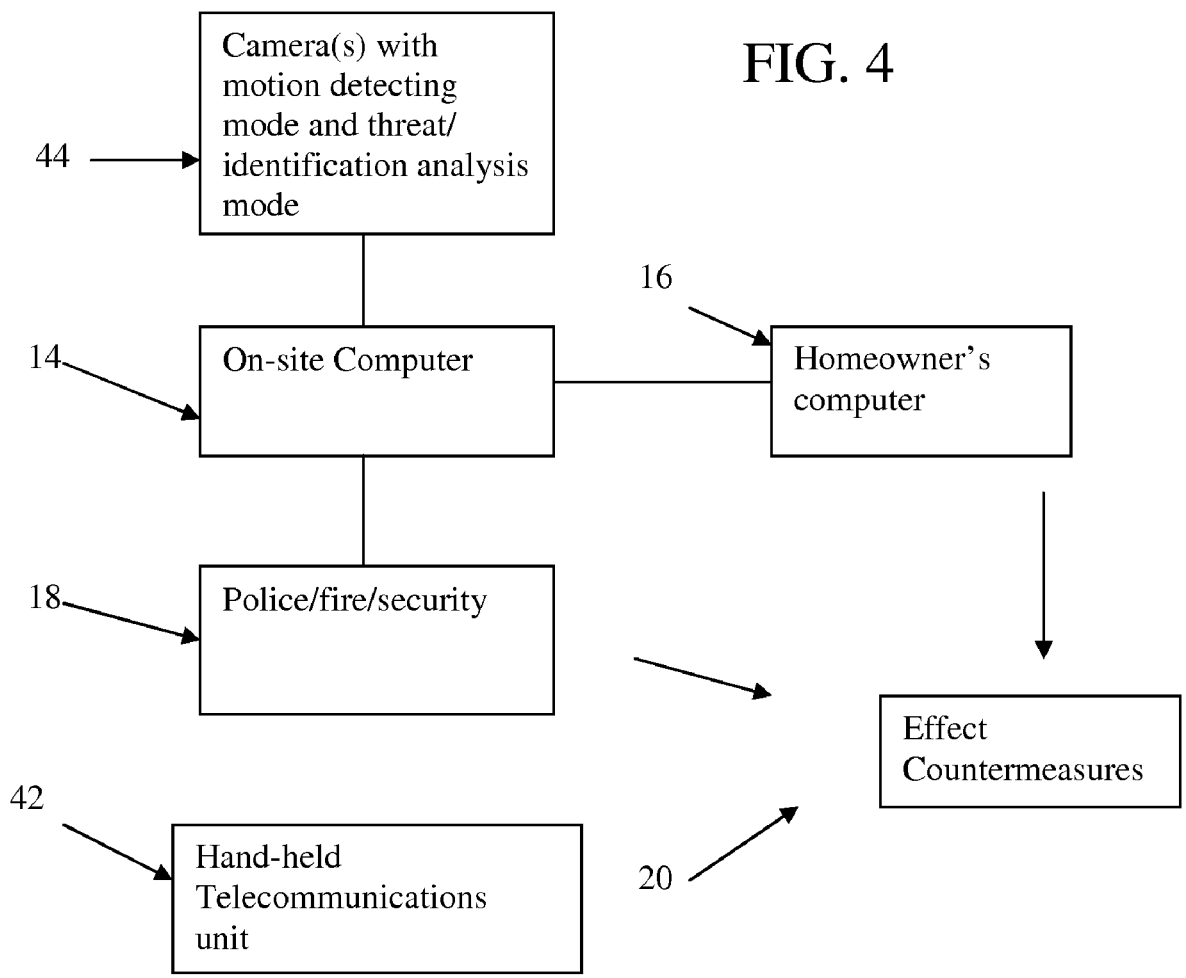
FIG. 4 is a schematic of a second embodiment of an alarm system in accordance with the invention.

Referring now to FIG. 4, this embodiment is substantially the same as the embodiments described above however instead of separate motion detectors and cameras, the camera functions as both the unit which detects motion and the identification unit. Specifically, one or more cameras 44 are provided which can obtain images and analyze them to detect the presence of motion of an object. At this stage, there is no identification of the object but rather analysis of the images may be limited to solely detecting motion. Once motion is detected, images previously obtained to enable the motion detection analysis and/or those obtained after the motion detection analysis are analyzed for identification purposes. The cameras can thus be designed to have a first, motion detecting state in which images are used only for motion detection analysis and a second identification detecting state in which images are analyzed to classify an object causing the motion. Moreover, cameras can be designed to simultaneously provide motion detection and object identification.

Functioning of a camera as both a motion detector and object identifier can be enabled through software which controls the analysis of images obtained by the camera. Motion detection algorithms can be utilized to analyze pictures taken at different times, e.g., a comparison of two images taken from the same camera with an object in each, while object identification algorithms can be utilized to analyze individual pictures to identify objects and/or ascertain the presence of threats to the monitored premises based on data in the images.

Cameras used in the invention may have two simultaneous modes, motion detection and video notification. Thus, they can be designed to obtain multiple images to analyze the presence of motion of objects in those images and also to transmit via a telecommunications link one or more of the obtained images.

Described above, among other things, is a technique for control and feedback for an alarm system using a camera telephone, cellular telephone or other preferably hand-held telecommunications device. The same technique can be used for an Internet-enabled video iPod-type device, i.e., a device which receives image or video data in the form of files via the Internet. An additional or alternative technique for implementation in an alarm system in accordance with the invention is threat recognition by video analysis. The alarm system can be programmed to automatically recognize a threat in advance using video detection. A determination of normal objects on the premises is first made and then, during monitoring by the alarm system, the alarm system employs digital signal processing and image comparison to differentiate between an animal or inanimate object, and/or a moving object as opposed to a stationary person or object.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention. Specifically, it should be understood that the manner in which information about the threat, such as an indication of motion or the presence of an identified object, is transmitted to a remote site may be as disclosed above or an alternative known to those skilled in the premise security field. The standards for such an information transmission or communication would be governed by the applicable wireless transmission standards and industry self-regulating groups, if any, in whatever country the security system is used, e.g., the FCC in the United States.

The invention claimed is:

1. An alarm system for protecting a structure, comprising:
at least one motion detector arranged to have a field of view external of the structure and including an area proximate the structure;
at least one camera associated with and coupled to each of said at least one motion detector, each of said at least one camera being arranged relative to the associated one of said at least one motion detector such that said camera has a field of view encompassing at least part of the field of view of the associated one of said at least one motion detector, each of said at least one camera having a dormant state in which images are not obtained and an active state in which images are obtained and being activated into the active state when the associated one of said at least one motion detector detects motion;
a processor coupled to said at least one camera and arranged to control said at least one camera and receive the image obtained by said at least one camera;
a telecommunications module coupled to said processor, said telecommunications module being capable of communications over a telecommunications network; and
a handheld telecommunications unit for transmitting commands for said processor via said telecommunications module to cause said processor to provide images to said telecommunications module to be transmitted to the telecommunications unit.

2. The alarm system of claim 1, wherein said processor is coupled to said at least one motion detector and said telecommunications unit is also arranged to transmit commands for said processor to activate and deactivate said at least one motion detector.

3. The alarm system of claim 1, wherein in said dormant state of each of said at least one camera, imaging by said camera is not performed and images are not obtained, each of said at least one camera being automatically activated from the dormant state into the active state when the associated one of said at least one motion detector detects motion in its field of view.

4. The alarm system of claim 1, wherein said telecommunications unit is one of a camera telephone, a cellular telephone and an Internet-enabled picture and/or video display device.

5. The alarm system of claim 1, wherein said processor is arranged to receive, via said telecommunications module, one of a plurality of different code numbers from said telecommunications unit and control said at least one camera and said at least one motion detector in accordance with the received code number.

6. The alarm system of claim 5, wherein one of the code numbers is to cause said processor to cause images to be provided by said processor to said telecommunications module and transmitted to the telecommunications unit.

7. The alarm system of claim 5, wherein one of the code numbers is to cause said processor to direct said at least one camera to provide images to said processor and then cause the provided images to be forward by said processor to said telecommunications module and transmitted to the telecommunications unit.

8. The system of claim 1, wherein said at least one motion detector comprises a plurality of motion detectors, said at least one camera associated with said at least one motion detector being arranged to have a field of view overlapping a field of view of a plurality of said motion detectors.

9. The alarm system of claim 1, wherein said processor is further arranged to derive a silhouette of any objects in the image, compare the silhouettes to a library of stored silhouettes having associated object identification to determine an exact or closest match of the derived silhouette to one of the stored silhouettes and retrieve the object identification associated with the exact or closest match, said processor being arranged to react to the detection of motion by said at least one motion detector based on the object identification.

10. The system of claim 9, wherein said at least one motion detector comprises a plurality of motion detectors and said at least one camera comprises a plurality of cameras, at least one of said cameras being associated exclusively with each of said motion detectors, at least two of said cameras are associated exclusively with each of said motion detectors or at least two of said cameras are associated non-exclusively with each of said motion detectors, and
wherein when at least two of said cameras are associated with one of said motion detectors, each of said at least two cameras has a dormant state in which imaging by said camera is not performed and images are not obtained and an active state in which images are obtained, said at least two cameras all being activated from the dormant state into the active state when the associated one of said motion detectors detects motion in its field of view such that said at least two cameras obtain images of the source of the motion detected by the associated one of said motion detectors, and said processor being arranged to analyze images from said at least two cameras to determine depth information about a common object appearing in the images from said at least two cameras which may be the source of the motion, the depth information being used in the object identification being performed by said processor and indicating a distance between the structure and the object, said processor being arranged to react to the detection of motion by said at least one motion detector based on the object identification and based on the distance between the structure and the object.

11. A method for protecting a structure, comprising:

arranging a plurality of motion detectors on or around the structure, each in a position in which its field of view includes an area proximate the structure;

arranging a plurality of cameras on or around the structure, each camera being associated with one or more of the motion detectors such that the camera has a field of view encompassing at least part of the field of view of any associated motion detector, providing a processor which controls the at least one camera and receives the image obtained by the at least one camera;

coupling a telecommunications module coupled to the processor, the telecommunications module being capable of communications over a telecommunications network; and transmitting commands from a handheld telecommunications unit to the processor via the telecommunications module to cause the processor to provide images to the telecommunications module to be transmitted to the telecommunications unit.

12. The method of claim 11, wherein the processor further derives a silhouette of any objects in the image, compares the silhouettes to a library of stored silhouettes having associated object identification to determine an exact or closest match of the derived silhouette to one of the stored silhouettes and retrieves the object identification associated with the exact or closest match, further comprising generating a countermeasure to the detection of motion by the motion detectors based on the object identification when the object is identified as a potential threat to the structure.

13. The method of claim 12, wherein each camera is associated with only a single motion detector, each camera is associated with a plurality of motion detectors or multiple cameras are associated with each motion detector, wherein when a plurality of cameras are associated with one of the motion detectors, images from the plurality of cameras are analyzed by the processor to determine depth information about an object appearing in the images, the depth information being used in the object identification being performed by the processor.

14. The method of claim 12, further comprising assigning a classification of "no threat" or "hostile" based on the object identification and/or the size of the object, the countermeasure being generated only when the classification is hostile.

15. The method of claim 12, wherein the step of generating a countermeasure includes generate an audible and/or visual alarm in proximity to the structure or generating at least one communication about the condition of the structure based on the object identification and forwarding the communication to a remote destination.

16. The method of claim 15, wherein the remote destination is a police station, a fire station, a terminal monitored by an owner of the structure, or a private security station.

17. The method of claim 15, further comprising including one or more images obtained from the cameras or one or more images derived from the images obtained from the cameras in the communication being forwarded to the remote destination.

18. The method of claim 11, further comprising programming the telecommunications module to receive commands from a handheld telecommunications unit over the telecommunications network to enable activation and deactivation of the motion detectors and cameras using the telecommunications unit.

19. The method of claim 11, wherein the processor is arranged to receive, via the telecommunications module, one of a plurality of different code numbers from the telecommunications unit and control the at least one camera and the at least one motion detector in accordance with the received code number.

20. The method claim 19, wherein one of the code numbers is to cause the processor to cause images to be provided by the processor to the telecommunications module and transmitted to the telecommunications unit.

* * * * *